(12) United States Patent
Daniel et al.

(10) Patent No.: US 7,828,075 B2
(45) Date of Patent: Nov. 9, 2010

(54) REMOTE TOOLING

(75) Inventors: Gerald A. Daniel, Cumbria (GB); Brent Broadhurst, Leigh (GB); James Harken, Cumbria (GB); Colin Robson, Cumbria (GB)

(73) Assignee: British Nuclear Fuels PLC, Chesire (GB)

( * ) Notice: Subject to any disclaimer, the term of this patent is extended or adjusted under 35 U.S.C. 154(b) by 976 days.

(21) Appl. No.: 10/563,714

(22) PCT Filed: Jul. 5, 2004

(86) PCT No.: PCT/GB2004/002915

§ 371 (c)(1),
(2), (4) Date: Oct. 10, 2006

(87) PCT Pub. No.: WO2005/005106

PCT Pub. Date: Jan. 20, 2005

(65) Prior Publication Data

US 2007/0156004 A1 Jul. 5, 2007

(30) Foreign Application Priority Data

Jul. 8, 2003 (EP) .................................. 0315945

(51) Int. Cl.
*E21B 41/00* (2006.01)
(52) U.S. Cl. ...................... 173/184; 173/185
(58) Field of Classification Search .............. 173/184, 173/185, 186, 189; 227/111; 373/92
See application file for complete search history.

(56) References Cited

U.S. PATENT DOCUMENTS 3,760,491 A * 9/1973 Zankl et al. .................. 483/43
3,760,956 A * 9/1973 Burch ....................... 414/744.3
4,400,815 A * 8/1983 Dunn et al. .................... 373/92
4,526,311 A 7/1985 Schroder
4,610,592 A 9/1986 Pienta ............................ 41/38
6,082,797 A * 7/2000 Antonette ................ 294/103.1

FOREIGN PATENT DOCUMENTS

| EP | 0 108 587 | 5/1984 |
| EP | 0275874 | 7/1988 |
| FR | 2614230 | 10/1988 |
| GB | 859162 | 1/1961 |

(Continued)

OTHER PUBLICATIONS

Notification of Transmittal of The International Search Report and The Written Opinion of the International Search Authority w/enclosures for PCT/GB2004/002916.

(Continued)

*Primary Examiner*—Sameh H. Tawfik
*Assistant Examiner*—Nathaniel Chukwurah
(74) *Attorney, Agent, or Firm*—Myers Bigel Sibley & Sajovec

(57) ABSTRACT

An apparatus for manipulating a target includes a base which may be secured to a trolley and a hydraulic arm mounted on the base arranged for being controlled remotely by a user. The arm includes at an end distal from the base a tool coupling which is arranged to receive a variety of tools for performing work on the target object.

10 Claims, 7 Drawing Sheets

Figure 1:
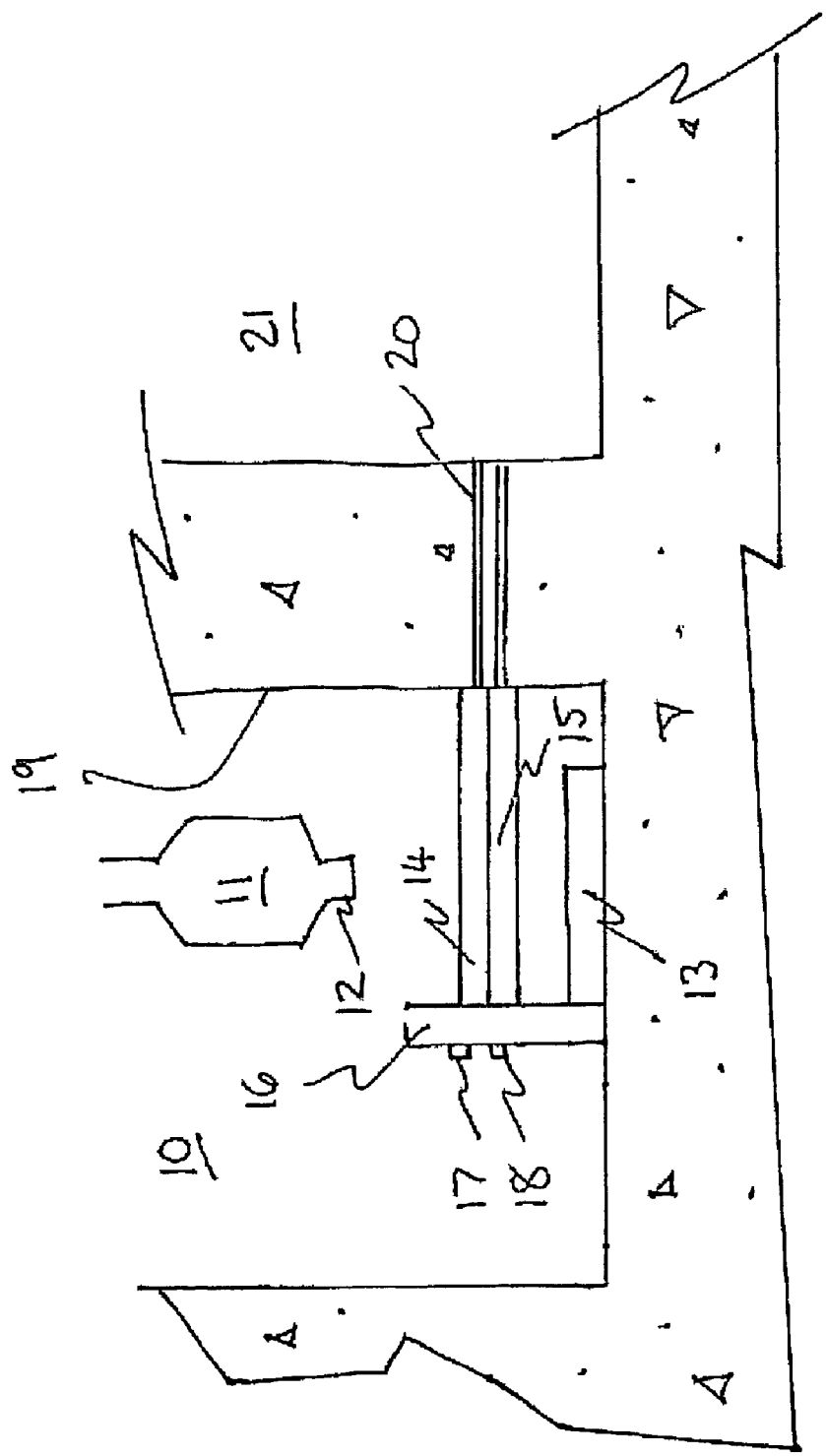

| | FOREIGN PATENT DOCUMENTS | | | JP | 2001349500 | 12/2001 |
|----|----|----|----|----|----|----|
| GB | 2 139 804 A | 11/1984 | | | | |
| JP | 60047999 | 3/1985 | | | | |
| JP | 63-283885 | 11/1988 | | | | |
| JP | 2001096366 | 4/2001 | | | | |

OTHER PUBLICATIONS

Search Report for Application No. GB 0315945.6, searched Jan. 8, 2004.

* cited by examiner

REMOTE TOOLING

RELATED APPLICATIONS

The present application is a 35 U.S.C. §371 national phase application of PCT International Application No. PCT/GB2004/002915, having an international filing date of Jul. 5, 2004, and claiming priority to Great Britain Patent Application No. 0315945.6, filed Jul. 8, 2003, the disclosures of which are incorporated herein by reference in their entireties. The above PCT International Application was published in the English language and has International Publication No. WO 2005/005106 A1.

BACKGROUND

1. Field of the Invention

The present invention relates to apparatus and a method for working with target objects in an area having restricted access. In particular, but not exclusively, the present invention relates to providing a variety of tools which can be applied to work target objects in a hazardous in-cell region of a vitrification plant.

2. Related Art

It is well known that there are areas which provide a hazardous environment to human beings. Access to these areas must often be restricted. One example of such an environmentally hazardous area is in an in-cell region of a vitrification plant. In such an in-cell region radioactive waste material is mixed with molten glass and poured in a canister where the glass solidifies. The solidified glass block so formed may be stored thereafter and helps contain the radioactivity. An example of such a vitrification process is the continuous vitrification process developed at the AVM (Atelier De Vitrification Marcoule). This is often referred to as the AVM process.

The in-cell area in such a plant includes pre-existing equipment and apparatus which enables the AVM process to be carried out. After a period of time various parts or equipment in such a hazardous area may cease to function correctly and may need replacement. Alternatively improvements may be developed which would help make the pre-existing process more efficient. In either event parts of the apparatus or equipment should be removed from the in-cell region. These parts will be contaminated and will themselves be hazardous to humans and therefore their disposal and movement should be carried out remotely so as to avoid contact with humans.

It is known to provide such hazardous environments with in-cell manipulators. These often comprise large arms with grasping claws which can be operated by a user in an adjacent room often separated by thick walls and a protective window. These manipulators can manipulate target objects so that human users do not have to access the in-cell hazardous area. However these manipulators have a restricted range of motion and thus the activities which can be carried out are limited. The manipulators are typically developed to carry out one or two preset processes during the normal running of the vitrification plant. The manipulators are therefore not well suited to the removal or replacement of parts of the plant which actions constitute non-standard activities.

It is an aim of embodiments of the present invention to at least partly mitigate the above-referenced problems.

SUMMARY OF EMBODIMENTS OF THE INVENTION

According to a first aspect of the present invention there is provided an apparatus for manipulating a target object in an in-cell region of a vitrification plant, comprising:
a base securable to a trolley; and
a hydraulic arm mounted on said base arranged for being controlled remotely by a user located outside said in-cell region; wherein
said arm includes, at an end distal from said base, a tool coupling arranged to receive a tool for performing work on said target object.

Embodiments of the present invention enable a wide range of activities to be carried out in a hazardous environment. Many of these activities would not be feasible by using existing manipulation methods and apparatus.

Embodiments of the present invention utilise pre-existing parts of apparatus and equipment in an in-cell region to provide a wide range of motion for a manipulator without having to introduce cumbersome and possibly expensive new equipment.

BRIEF DESCRIPTIONS OF THE DRAWINGS

Figure 2:
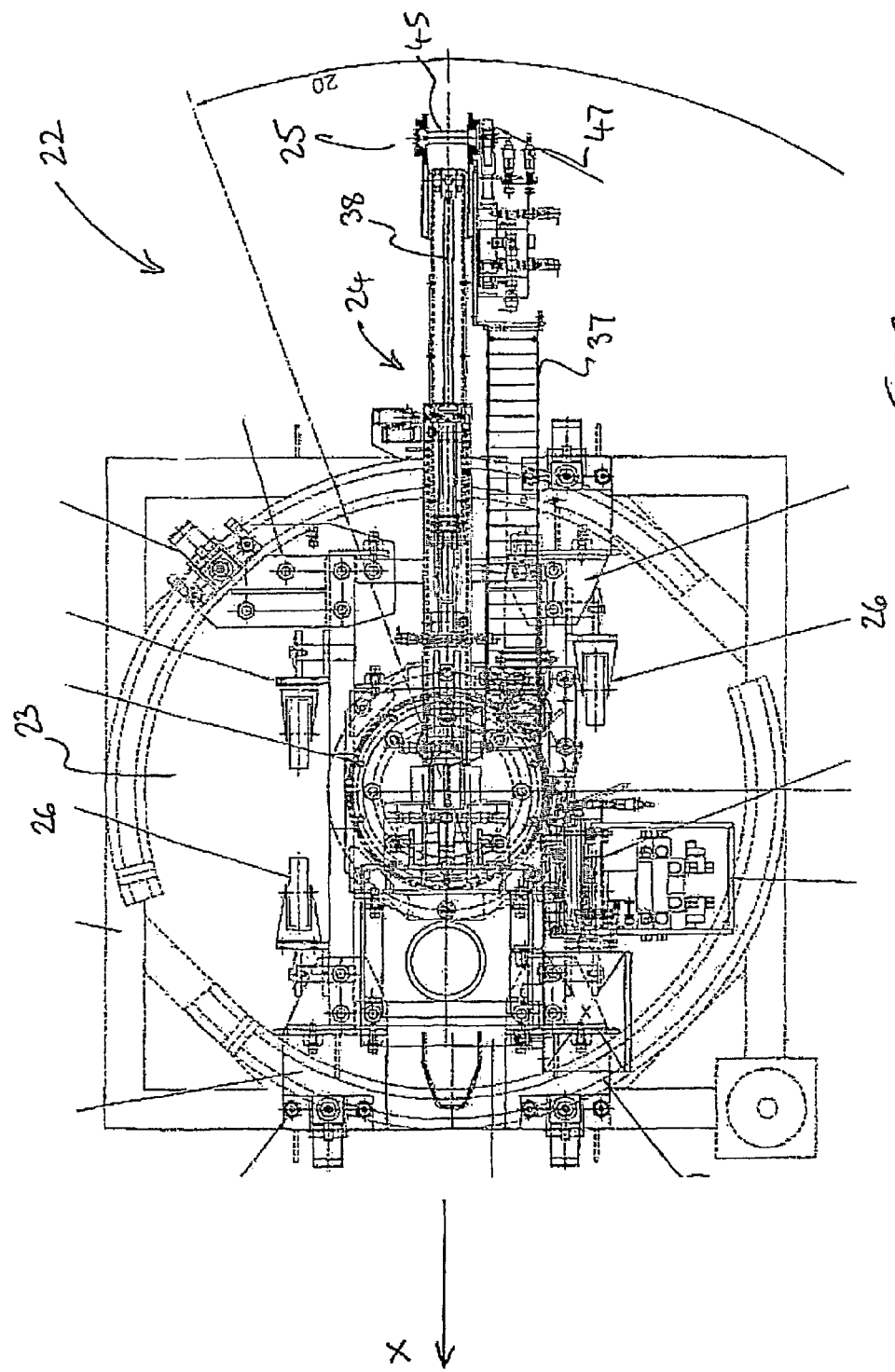
Figure 3:
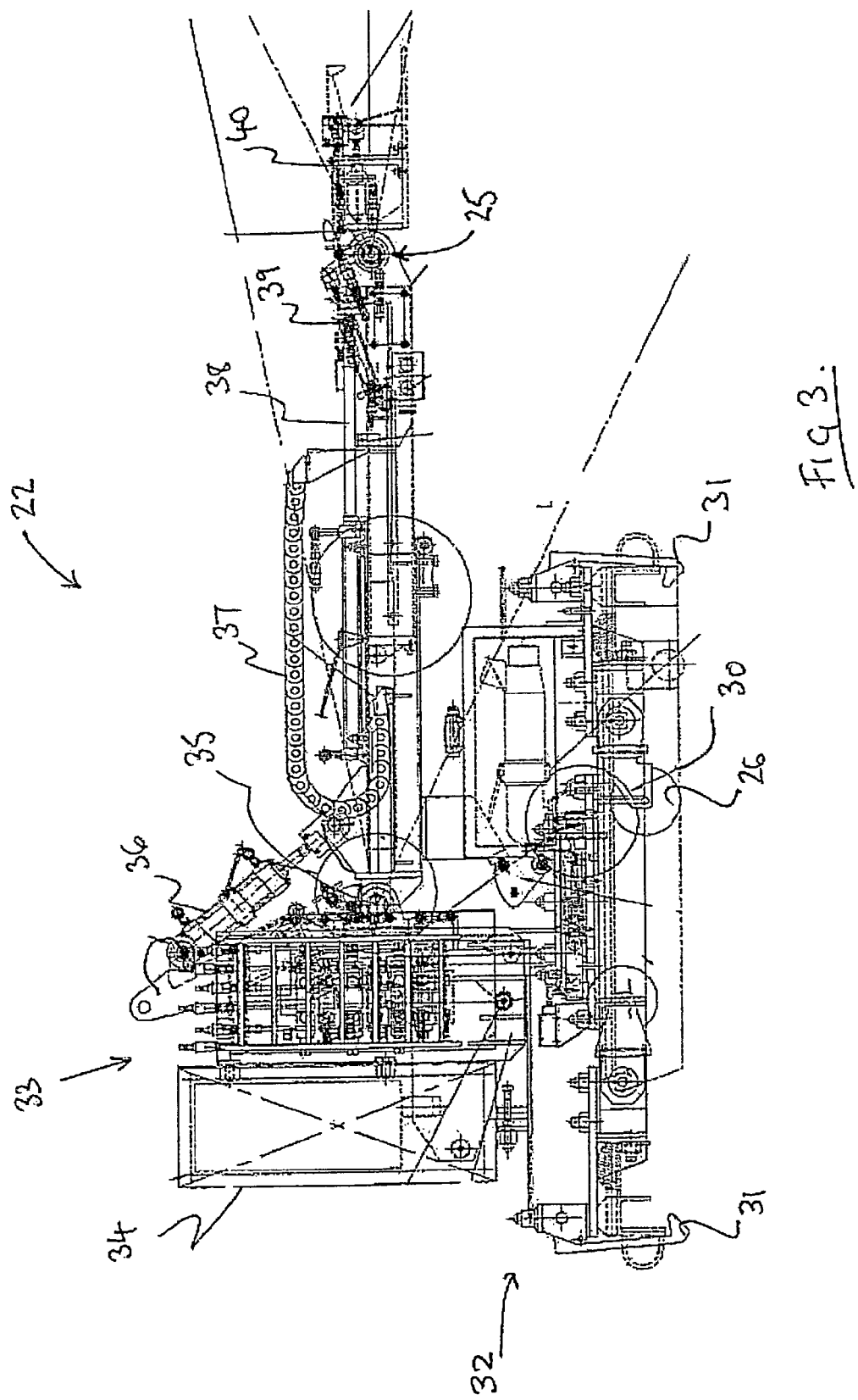
Figure 4:
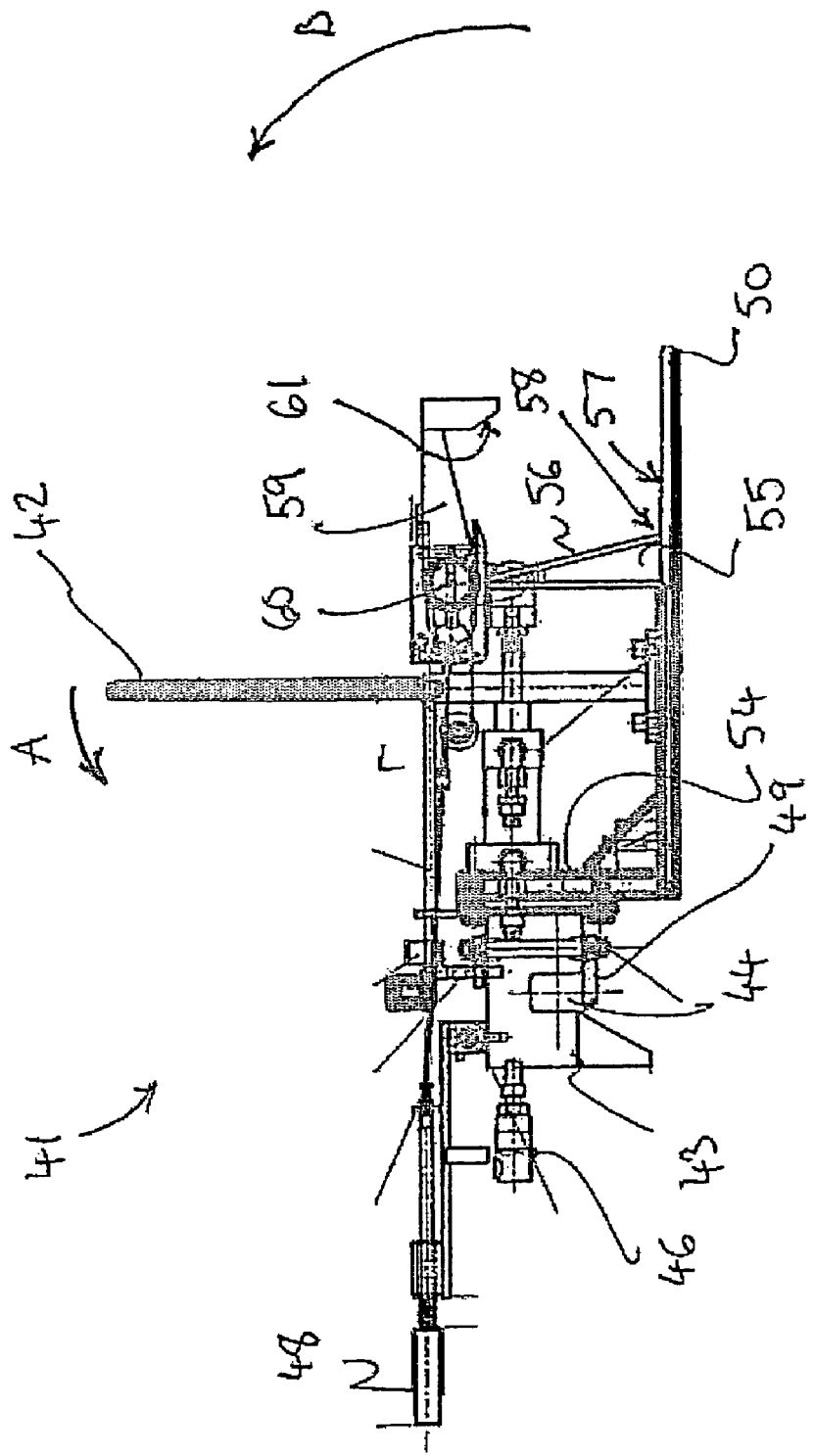
Figure 5:
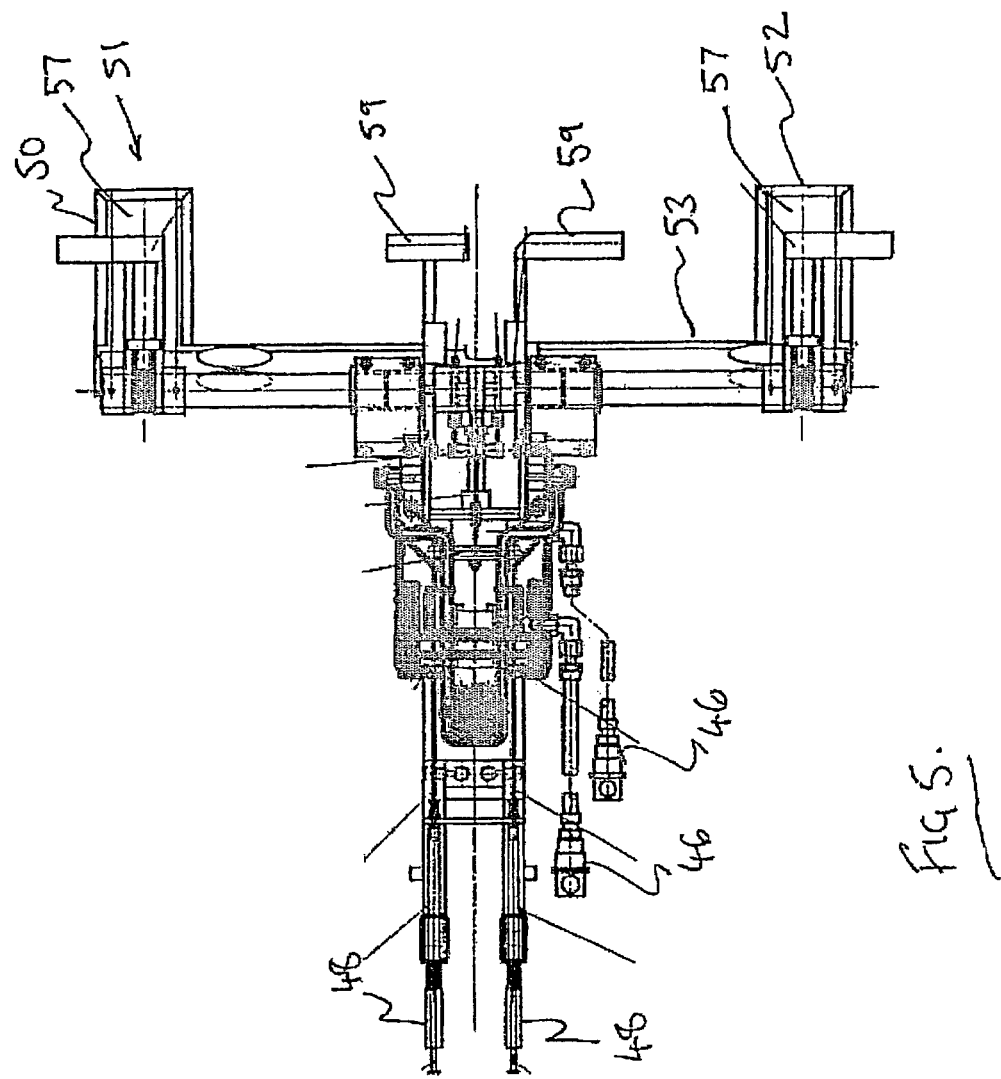
Figure 6A:
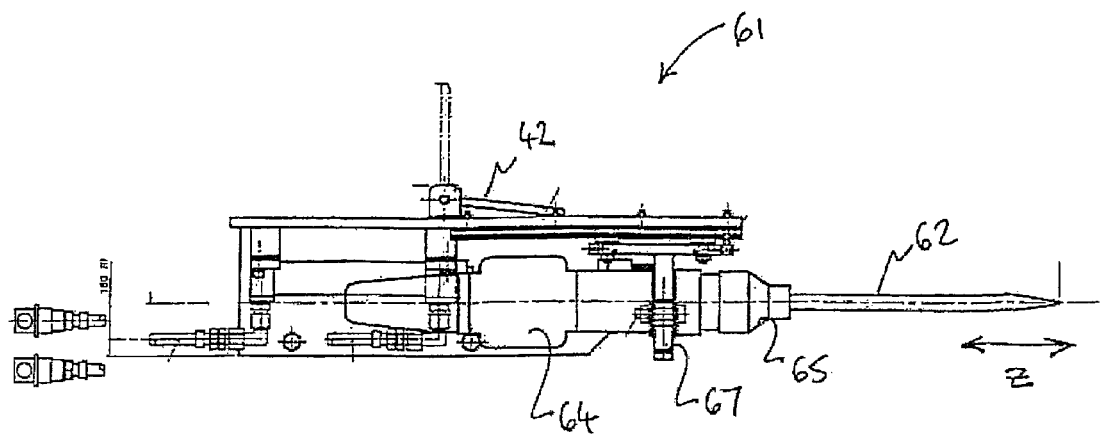
Figure 6B:
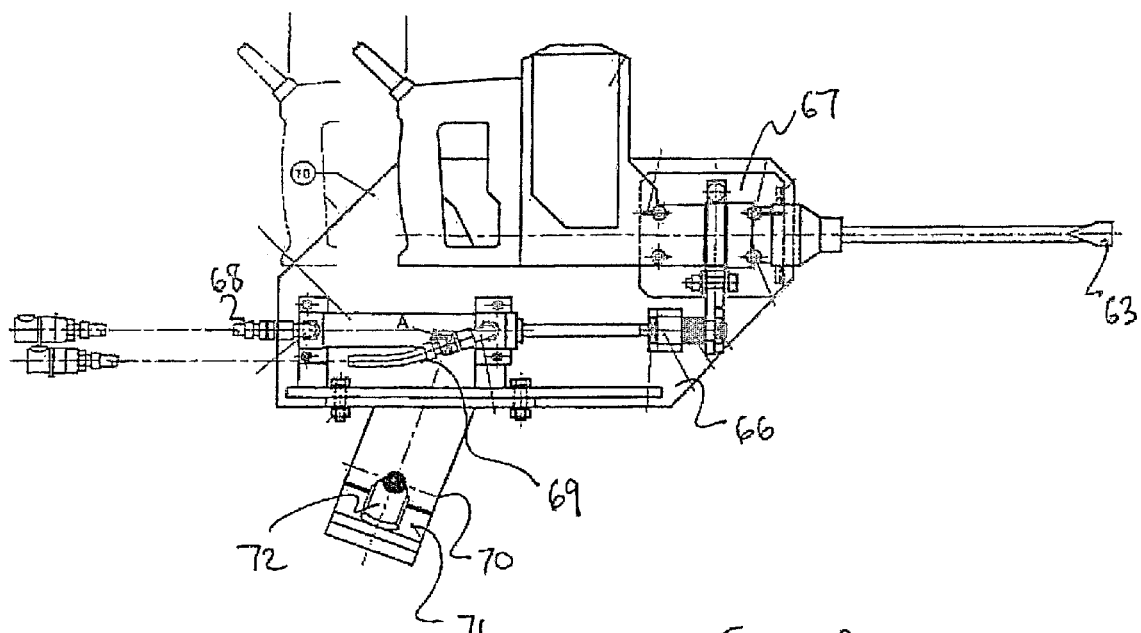
Figure 7:
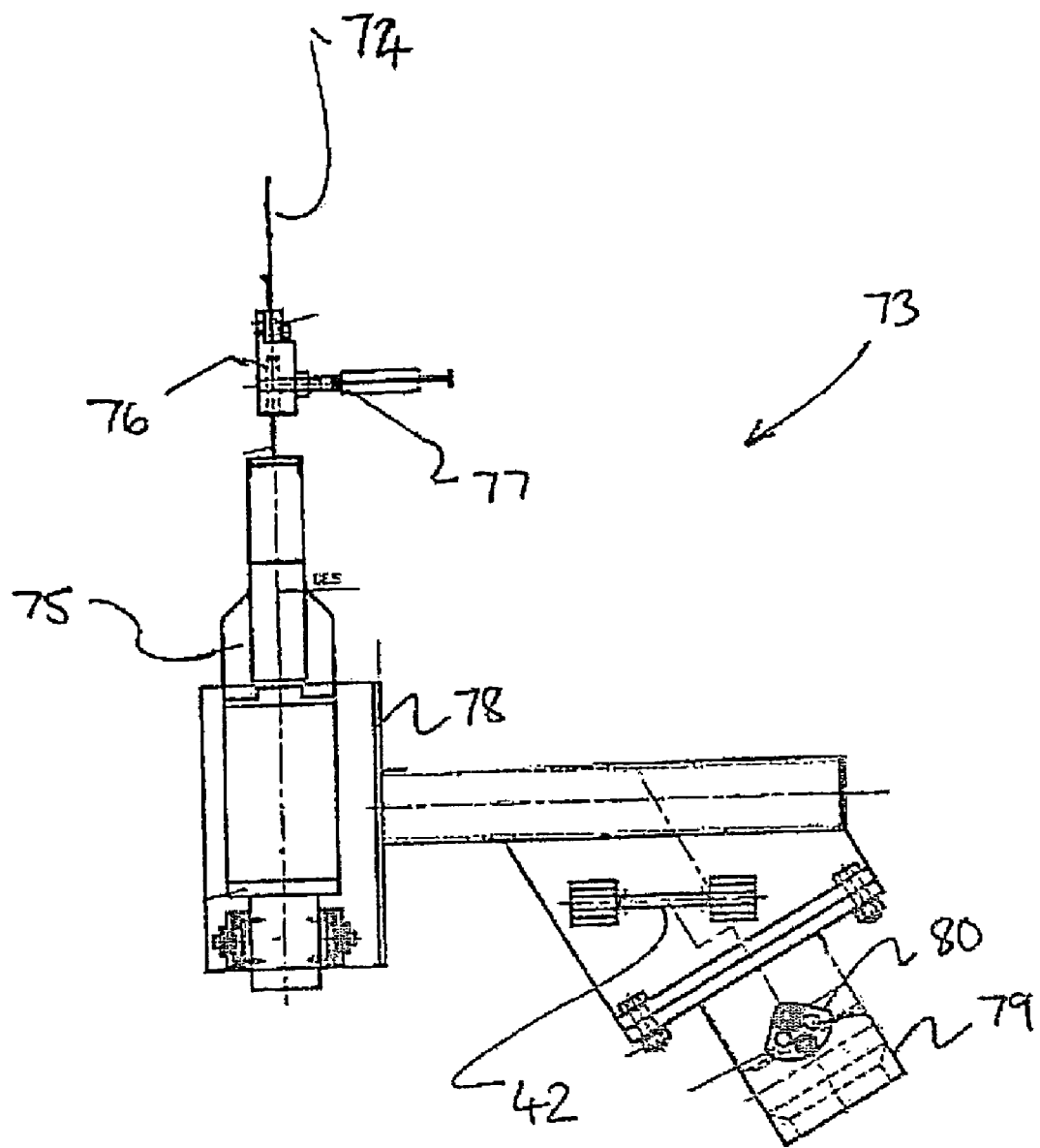

Embodiments of the present invention will now be described hereinafter, by way of example only, with reference to the accompanying drawings in which:
FIG. 1 illustrates an in-cell region;
FIG. 2 illustrates manipulator apparatus from above;
FIG. 3 illustrates manipulator apparatus from a side;
FIG. 4 illustrates a side view of a holding tool;
FIG. 5 illustrates a top view of a holding tool;
FIG. 6 illustrates a chisel tool; and
FIG. 7 illustrates a saw tool.
In the drawings like reference numerals refer to like parts.

DESCRIPTION OF EMBODIMENTS ACCORDING TO THE INVENTION

FIG. 1 illustrates a cutaway view of an in-cell region 10 which is an example of a hazardous environment in which embodiments of the present invention can be used. The in-cell region 10 comprises a zone in which radioactive waste material is added to glass in an induction furnace 11. The glass and radioactive waste material are mixed together and then are output from a lower exit region 12 of the furnace were the melted products pours into a canister (not shown) below the furnace. The canister can be mounted on a melter trolley 13 which allows the canister to be slid underneath the exit 12 and then when full to be slid sideways in a direction into the page and thereafter removed. These steps form part of a vitrification process which is often referred to as the AVM process as noted hereinabove. It will be understood that embodiments of the present invention are not restricted to use in such an environment but rather provide an apparatus and method which can be generally applied were a variety of tools are required at locations which are hazardous and which must therefore be operated remotely.

FIG. 1 also illustrates portions of equipment and apparatus which may be present in the in-cell region 10. For example the induction furnace 11 requires supplying with power and/or water which may be used as an outer coolant. This may be achieved using in-cell connectors 14 and 15 as is known in the art. There may be many of these in the in-cell region. These are secured at an in-cell end post 16 and to respective end connections 17 and 18. They are joined at an end adjacent to an in-cell surface 19 to through-wall connectors 20. It will be appreciated that the walls surrounding the in-cell region may be thick and/or manufactured from a dense material to provide protection for human users in adjacent safe areas, such as containment room 21, from the hazardous material such as the radioactive waste or biological hazard in the in-cell region. It will also be understood that a user in a containment area may be provided with in-cell manipulators which are in the form of long arms with claws (not shown). These enable the users to control the manipulator in-cell remotely. The users may be provided with a view of the in-cell region by either a thick glass window or video camera surveillance as is known in the art.

After prolonged use various portions of the equipment and apparatus in the in-cell region 10 may become degraded or faulty. Alternatively developments may be made which could improve the process carried out in the in-cell region. In either of these instances equipment and apparatus may need to be replaced which will involve disconnecting objects or portions of the equipment and then removing them from the in-cell region. These objects and parts of objects become target objects which must be worked on for example by cutting, chiselling, sawing, lifting or moving. The pre-existing manipulators will not be able to carry out all of the tasks necessary to replace or remove many of the parts in the in-cell region. This may be because they will not be able to reach a particular area or because they are not provided with tools suitable for carrying out particular tasks.

FIG. 2 illustrates apparatus which can be used to manipulate a target object such as a portion of the connectors 14 in-cell, in many ways. This apparatus 22 includes a base 23 to which an arm 24 is connected. The arm 24 includes, at an end away from the base 23, a tool coupling 25 to which a variety of tools may be connected whilst the manipulator 22 is in-cell. The base 23 may be secured to the melter trolley 13 already pre-existing in-cell. In this way the manipulator may be introduced in-cell secured to the melter trolley via a slewing ring and then slid underneath the furnace 11. The amount of sliding will bring a tool secured to the tool coupling within range of various parts of the apparatus and equipment in the hazardous region 10.

It will be understood that embodiments of the present invention may be used by introducing the manipulator into a hazardous region together with its own trolley. Alternatively wheels 26 can be used to slide the manipulator 22 into a desired position. It will be understood that these wheels may also be provided so that the manipulator can be wheeled into a position proximate to an existing melter trolley in cell. Use of the melter trolley helps improve rigidity which improves the accuracy of a tooling process. Additionally using pre-existing equipment keeps costs down.

FIG. 3 illustrates another view of the manipulator 22. The manipulator includes wheels 26, secured on wheel supports 30, which may be secured in a raised or lowered position. The wheels can be used to either locate the manipulator at a work site in-cell where target objects may be tooled or may be used to move the manipulator close to an existing melter trolley structure and thereafter the manipulator may be loaded onto the melter trolley and locked in place by means of securing clamps 31. This may be achieved using a pre-existing crane mechanism (not shown) which is often provided in such a hazardous region. It will be understood that this locking procedure may be carried out remotely. Once locked in place the wheels may be swung up into a raised position. The base 23 of the manipulator forms a support structure and includes a lower portion 32 and upwardly extending support column structure 33. A hydraulic power pack 34 acts as a counterbalance and supplies hydraulic fluid to raise and lower and drive the various moveable parts of the manipulator. Advantageously the hydraulic fluid should be water so that any spillages can be easily dealt with. However any other form of hydraulic fluid may be used.

A hydraulic arm 24 is connected to the column structure of the base about a pivotable mount 35. A hydraulic jack 36 may be driven to raise and lower the arm 24 about this pivot point. The arm 24 is formed of two telescopic components which may be hydraulically driven so as to extend or decrease the length of the arm and thus help to locate a tool at a desired location with respect to a target object. It will be understood that embodiments of the present invention may not require this degree of motion in which case the hydraulic jack 38, which may be used to extend or contract the length of the arm, may not be required. A tool coupling 25 is provided at the end of the arm 24. Various tools each for carrying out a respective operation may be fitted to this coupling to enable the manipulator to carry out a wide range of operations. The tool illustrated in FIG. 3 is a lifting tool which will be described more fully with respect to FIGS. 4 and 5. Hydraulic jacks 39 and 40 are included on the arm 24 and tool 41 respectively so that the degrees of motion required by the tool can be provided. Ideally three degrees of motion are provided although embodiments may be used which include two or less.

FIG. 4 illustrates a holding tool 41 which may be coupled to the coupling 25 on the arm of the manipulator 22. This coupling can be carried out by, once the manipulator is in-cell, manoeuvring the holding tool 41 by lifting the tool via a handle 42 and locating a coupling 43 having a trench joint 44 over the bar 45 of the coupling 25 of the manipulator. This lifting process may be carried out by an in-cell crane and pre-existing in-cell manipulator. Once the coupling is placed so that the bar 45 is located in the trench 44 hydraulic connectors 46 will be mated with hydraulic connectors 47 at the end of the manipulator. Further hydraulic connectors 48 may also be connected to mating connectors on the end of the manipulator arm. A locking pin 49 may be hydraulically or mechanically driven to swing out to close an opening of the trench 44 to lock the bar 45 within the trench. Other forms of locking mechanisms may be used. It will be understood that thereafter the holding tool can be tilted by raising and lowering about this pivot point formed axially along the length of the trench 44. Once the hydraulic pressures are established in the various hydraulic pipes and connectors the holding tool will be held in position by the hydraulic pressure. Thereafter the handle 42 may be lowered in the direction of arrow A so that it does not interfere with subsequent operations.

The holding tool includes a substantially C-shaped plate-like lifting platform 50 which includes two fingers 51 and 52 (illustrated in FIG. 5) and a connecting beam 53. A support back plate 54 extends substantially vertically from the lifting platform 50. The back plate is connected to the platform 50 at a lower edge region and is braced using a triangular brace for extra rigidity. The thickness of the platform 50 is selected so that it may be slid under objects in the in-cell region. Alternatively if the platform is to lift heavy objects the shape and thickness of the platform can be selected accordingly. To aid the sliding process the ends of the platform may be chamfered. It will be understood that different shapes of platform 50 could be used for example a central foot could be used or a simple solid plate.

A rest 55 extends upwardly from a portion of the platform 50. The rest includes an angled resting surface 56 which is angled backwardly with respect to the platform 50. When the holding tool is advanced under a target object such as a portion of an in-cell connector 14 the lower surface of the target object will rest on the upper surface 57 of the feet of the platform. The arm may be hydraulically extended to advance the holding tool under the target object until a corner region of a target engages with the lower region 58 of the rest. At this stage the tool may be driven to pivot about the bar 45 in an upwardly anti-clockwise direction illustrated by arrow B. At this stage contact of the target object with the upper surface 57 will be lost and the target object will rock about point 58 until it engages with the surface of the angle surface 56 of the rest. A supporting finger 59 (or fingers) can be used to lock a target object in position by being driven in a clockwise motion about pivot point 60 until a target object engaging surface 61 clamps the target object against the rest 56. This rocking motion is particularly advantageous when target objects are themselves pre-located on an angled stand which would otherwise prevent target objects located on platform 50 being removed by a simple lateral motion of the manipulator 22 in direction X shown in FIG. 2.

FIG. 6 illustrates another tool which can be coupled to the tool coupling of the manipulator in accordance with another embodiment of the present invention. The tool 61 provides a chiselling action in which a chisel bit 62 having a chisel tip 63 may be driven by a drive unit 64 in a reciprocating motion illustrated by arrow Z. The chisel bit 62 may be replaced in the drive unit 64 by releasing a securing chuck 65 as will be understood by those skilled in the art. This may be carried out hydraulically or via a pre-existing in-cell manipulator. The drive unit 64 is secured to a support 66 by a securing frame 67 and power may be supplied via connectors 68 and 69. A tool coupling 70 is attached to the support frame 66. It will be understood that the support and coupling could be integrally formed. The coupling 70 includes a trench portion 71 in which the bar of the coupling of the manipulator will fit. A locking mechanism 72 may be driven hydraulically or mechanically to lock this coupling in place. By driving the manipulator 22 backwards and forwards on the trolley and by raising the arm using hydraulic jack 36 and possibly extending the arm using hydraulic jack 38 a very wide range of motion can be provided so that the chisel point 63 may be brought to bear on a wide range of target objects in the in-cell area. The wide range of motion of the manipulator and chisel tool which may have up to three degrees of motion ensures that a very versatile cutting system is provided.

FIG. 7 illustrates a further tool which may be coupled to the manipulator 22. This sawing tool 73 includes a saw blade 74 which may be attached to a drive unit 75 via a chuck mechanism 76. The variety of saw blade may be selected according to the particular job to be performed by the saw tool. A further portion 77 is provided which acts as an MSM friendly jaw which allows the saw to be positioned using an in-cell manipulator (MSM). The drive unit 75 is secured to a support 78 so that it can be held rigidly. A coupling 79 is also secured to the support 78 so that the whole saw tool may be coupled to the manipulator 22. It will be appreciated that the support structure and coupling could be integrally formed. The coupling 79 includes a trench portion which may fit over the bar 45 of the manipulator coupling and a locking catch 80 which may be hydraulically or mechanically swung into place to lock the saw tool on the end of the arm of the manipulator. By virtue of the various degrees of motion of the manipulator the saw blade 74 may be brought to a wide variety of angles of attack of any part of a target object in the in-cell region. This provides a very versatile tool.

A wide variety of further tools may be provided as will be understood by those skilled in the art. For example a vacuum cleaner tool may be used so that subsequent to a cutting or sawing operation in which shards or small pieces of material may be produced, and which may fall around and thus contaminate the in-cell region. These may be sucked up for later safe disposal. Alternatively a hammer action type of operation could be provided with a suitable tool or indeed a filing operation.

Embodiments of the present invention provide a way in which a variety of different operations such as sawing, chiselling and lifting may be carried out to apparatus contaminated in a hazardous environment by remote users. Embodiments of the present invention are particularly advantageous for use in-cell in a vitrification plant in which an AVM process is carried out.

Embodiments of the present invention have been described in detail in the examples hereinabove. However it is to be understood that the present invention is not limited to the specific details set out in the examples.

The invention claimed is:

1. An apparatus for manipulating a target object in an in-cell region of a vitrification plant, comprising:
   a base securable to a trolley; and
   a hydraulic arm mounted on the base arranged for being controlled remotely by a user located outside the in-cell region; wherein
   the arm includes, at an end distal from the base, a tool coupling arranged to receive a tool for performing work on the target object, wherein the in-cell region includes a melter trolley, arranged to receive a canister into which a melt, formed during a vitrification process, is poured, and a plurality of connectors which are arranged for providing cooling fluid from a fluid source external to the in-cell region to an induction furnace located in the in-cell region.

2. The apparatus as claimed in claim 1 wherein the hydraulic arm is arranged to have three degrees of movement.

3. The apparatus as claimed in claim 1 further comprising:
   a hydraulic power pack for raising and lowering the arm with respect to the base and including hydraulic fluid.

4. The apparatus as claimed in claim 3 wherein the hydraulic fluid is water.

5. The apparatus as claimed in claim 1 wherein the target object comprises a portion of one of the connectors, each of the connectors comprising a through wall connection connecting the fluid source to an in-cell location through a protective wall.

6. The apparatus as claimed in claim 5 wherein the portion comprises a portion of the connector between an in-cell surface of the protective wall and the location.

7. The apparatus as claimed in claim 1 wherein the tool comprises any one of a clamp, vacuum nozzle, reciprocating saw and/or chisel.

8. An apparatus for manipulating a target object in an in-cell region of a vitrification plant, comprising:
   a base securable to a trolley; and
   a hydraulic arm mounted on the base arranged for being controlled remotely by a user located outside the in-cell region; wherein
   the arm includes, at an end distal from the base, a tool coupling arranged to receive a tool for performing work on the target object, the apparatus further comprising:
   a plurality of clamp devices each being controllable remotely to secure the base to an in-cell slewing ring of the melter trolley.

9. A holding tool arranged for securing to the tool coupling of an apparatus for manipulating a target object in an in-cell region of a vitrification plant, the apparatus comprising a base securable to a trolley; and a hydraulic arm mounted on the base arranged for being controlled remotely by a user located outside the in-cell region; wherein the arm includes the tool coupling at an end distal from the base, the holding tool comprising:

- means for lifting arranged to be advanced under and engage with a lower surface of the target object and for lifting the target object when an arm of the apparatus for manipulating a target object to which the holding tool is coupled is raised;
- a support back plate having a lower edge from which the means for lifting extends at a substantially perpendicular angle; and
- a rest member extending upwardly from the means for lifting and angled backwardly with respect to the means for lifting whereby as a target object is lifted a portion of the target object engages with a region of the rest member and rocks backwardly about this point and away from the lifting member until the target object is supported by the rest member.

10. The holding tool as claimed in claim 9 further comprising:

- a locking mechanism including a locking finger which is arranged to lock a target object at a predetermined location when the target object is supported by the rest member.

\* \* \* \* \*